(12) United States Patent
Mazzoleni et al.

(10) Patent No.: US 9,612,830 B2
(45) Date of Patent: Apr. 4, 2017

(54) DISCOVERING WORK-ITEM RELATIONS THROUGH FULL TEXT AND STANDARD METHOD ANALYSIS

(75) Inventors: Pietro Mazzoleni, New York, NY (US); Debdoot Mukherjee, West Bengal (IN)

(73) Assignee: International Business Machines Corporation, Armonk, NY (US)

( * ) Notice: Subject to any disclaimer, the term of this patent is extended or adjusted under 35 U.S.C. 154(b) by 852 days.

(21) Appl. No.: 13/370,936

(22) Filed: Feb. 10, 2012

(65) Prior Publication Data

US 2013/0212582 A1   Aug. 15, 2013

(51) Int. Cl.
  *G06F 9/44*    (2006.01)
  *G06Q 10/06*   (2012.01)

(52) U.S. Cl.
  CPC .......... *G06F 8/75* (2013.01); *G06F 8/20* (2013.01); *G06F 8/70* (2013.01); *G06F 8/74* (2013.01); *G06Q 10/0633* (2013.01)

(58) Field of Classification Search
  CPC ..... G06F 8/20; G06F 8/70; G06F 8/74; G06F 8/75; G06Q 10/0633
  See application file for complete search history.

(56) References Cited

U.S. PATENT DOCUMENTS

| | | | |
|---|---|---|---|
| 5,826,239 A * | 10/1998 | Du et al. ................... | 705/7.26 |
| 5,848,393 A * | 12/1998 | Goodridge et al. ......... | 705/7.27 |
| 7,020,533 B2 | 3/2006 | Luo | |
| 7,617,230 B2 * | 11/2009 | Srivastava | |
| 7,711,694 B2 * | 5/2010 | Moore ......................... | 707/608 |
| 7,735,068 B2 * | 6/2010 | Siddaramappa .... | G06F 11/3604 715/230 |
| 8,095,411 B2 * | 1/2012 | Beringer et al. ............. | 705/7.23 |
| 2003/0023662 A1 * | 1/2003 | Yaung .......................... | 709/106 |
| 2004/0119752 A1 * | 6/2004 | Beringer et al. .............. | 345/779 |
| 2004/0122853 A1 * | 6/2004 | Moore ............ | G06Q 10/06316 |
| 2006/0218028 A1 * | 9/2006 | Kelly ..................... | G06Q 10/06 705/7.11 |
| 2006/0241996 A1 | 10/2006 | Burger et al. | |
| 2006/0293939 A1 * | 12/2006 | Sun et al. ........................ | 705/8 |
| 2007/0179959 A1 | 8/2007 | Sharma et al. | |
| 2008/0201652 A1 | 8/2008 | Ho et al. | |
| 2009/0043766 A1 | 2/2009 | Wang et al. | |
| 2010/0023920 A1 * | 1/2010 | Chaar et al. .................. | 717/102 |
| 2010/0211924 A1 | 8/2010 | Begel et al. | |
| 2013/0198187 A1 * | 8/2013 | Botros .......................... | 707/737 |

* cited by examiner

*Primary Examiner* — Lewis A Bullock, Jr.
*Assistant Examiner* — Jacob Dascomb
(74) *Attorney, Agent, or Firm* — Scully, Scott, Murphy & Presser, P.C.; Louis J. Percello, Esq.

(57) ABSTRACT

Discovering work-item relations, in one aspect, may include identifying mappings of work-item elements to standardized specification elements, for instance, by analyzing a plurality of work-item elements and their relationships generated from a description of a collection of work-items, and a plurality of standardized specification elements and their relationships generated from a description of practice guidelines for completing the project. One or more missing relations may be discovered among the plurality of work-item elements based on the mappings.

21 Claims, 6 Drawing Sheets

DISCOVERING WORK-ITEM RELATIONS THROUGH FULL TEXT AND STANDARD METHOD ANALYSIS

FIELD

The present application relates generally to computers, and computer applications, and more particularly to discovering work-item relations.

BACKGROUND

Work-items generically indicate single unit of work which needs to be completed, for instance, in the context of a project. Generally, a project is an undertaking devised to achieve an aim or a goal and includes a plan or scheme involving specific tasks and types of resources. Projects have methods or methodologies, which may define project phases, tasks and workflow, providing specific guidelines or specifications that should be followed in the process of completing a project. Unified framework and Rational® Unified Process are examples which provide such project methods. A project may be associated with a plurality of work-items. For instance, in the context of a software project, work-items include, but are not limited to, the following types of work: design documents, issues, risks, test cases, bugs, and others. In the context of a business transformation project, work-items include, but are not limited to, the following types of work: functional specification, technical specification, reports, interfaces, process definition, strategy, organizational change, and others.

Work-items can be linked according to different link relation types, including, but not limited to: Parent Of, Children Of, Relate to, Blocks, Input From, Output To, Designed In, Tested By, and others to create the basis for project governance and E2E Traceability. In the context of a project, when users create work-items, relations between work-items might not always be expressed because, for example, all team members may not be aware of all activities in team so as to draw the correct relations, also, for example, because many users may miss populating often verbose work-items type and linkages. Not creating accurate relations or links results in unclassified work-item and missing information.

In practical terms, unclassified work-items or missing connections between the work-items may mean increase in project risks, because for example it would be difficult to tell how closely a procedure that should have been followed with respect to a specific work-item was actually followed; slow down in project management, because for instance, multiple reports need to be created and manually re-conciliated through user interaction to have a comprehensive view of the status of the project; slow down in testing, for instance, because work-items may be tested even before their dependent ones are completed; limited efficiency, for instance, because users may be requested to fill in a large number of information for each work-item they create, which could be done automatically if link types or relations have been properly configured; limited comprehension of team working on a project, for instance, because people may not be able to envisage the traceability between different tasks and deliverables stemming from missing work-item types indicating input and output; and poor standardization.

Organizations may establish and/or utilize a standard method or procedure set as practice guidelines for a project. For instance, Rational® Unified Process, Agile Method, Scrum Method are examples of methods used for software engineering projects while Oracle® Unified Method and ASAP (Accelerated SAP®) are methods used in business transformation projects. Each method or procedure defines various tasks, work-products (and optionally other elements such as risks, outcomes) and their possible inter-relationships. Examples of relations may be predecessor—successor dependence between tasks and input-Output work-products from tasks. Standard tools operationalize those methods, and monitor E2E (End to End) traceability.

BRIEF SUMMARY

A method of discovering work-item relations, in one aspect, may include analyzing a description of a collection of work-items created in one or more projects, to generate a plurality of work-item elements and their relationships. The method may also include analyzing one or more standardized specifications describing practices to follow in executing said one or more projects, to generate a plurality of standardized specification elements and their relationships. The method may further include mapping said plurality of work-item elements to said plurality of standardized specification elements. The method may also include discovering one or more missing relations or work-item elements, or combinations thereof, among said plurality of work-item elements based on said mapping.

In another aspect, a method of discovering work-item relations may include identifying mappings of work-item elements to standardized specification elements, by analyzing a plurality of work-item elements and their relationships generated from a description of a collection of work-items. Each of the work-items indicates a single unit of work needed to complete a project, a plurality of standardized specification elements and their relationships generated from a description of practice guidelines for completing the project. The method may also include discovering one or more missing relations among the plurality of work-item elements based on the mappings.

A system for discovering work-item relations, in one aspect, may include a link discovery module operable to identify mappings of work-item elements to standardized specification elements, by analyzing a plurality of work-item elements and their relationships generated from a description of a collection of work-items, each of the work-items indicating a single unit of work needed to complete a project, and a plurality of standardized specification elements and their relationships generated from a description of practice guidelines for completing the project. The link discovery module may be further operable to discover one or more missing relations among said plurality of work-item elements based on said mappings.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

System and methodologies are provided that infer one or more relations between work-items created in a project where such relations are under-specified. In one embodiment, work-items may be mapped to standard method (procedure) elements and relationships may be identified that are defined in the method (procedure) but are missing in the work-item collection.

Figure 1:
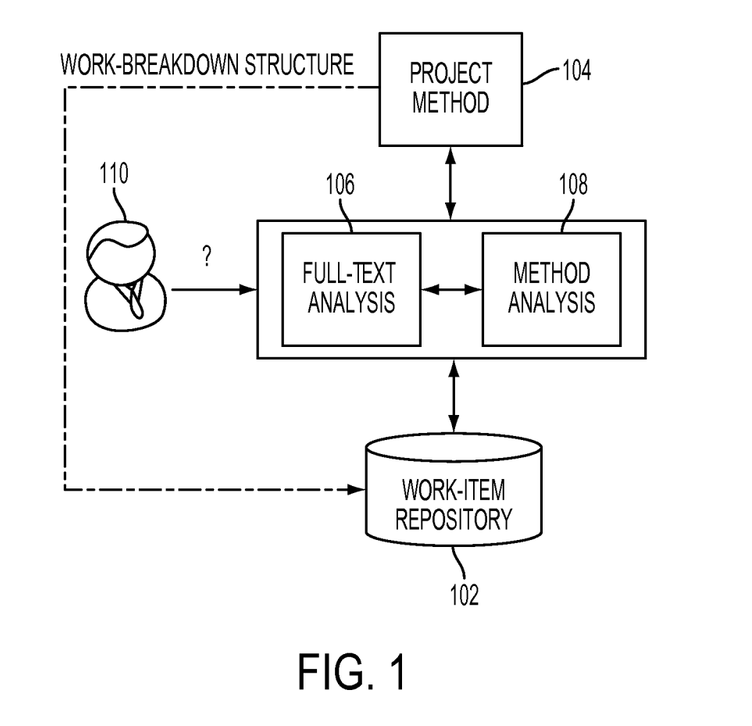
FIG. 1 illustrates discovering work-item relations through full text and method analysis in one embodiment of the present disclosure.

FIG. 1 illustrates discovering work-item relations through full text and method analysis in one embodiment of the present disclosure. A work-item repository 102 contains work-item and their description. As discussed above, a work-item refers to a unit of work which needs to be completed in the context of a project. For example, in the context of a software project, work-items may include work related to, but are not limited to, design documents, issues, risks, test cases, bugs, and others. As another example, in the context of a business transformation project, work-items may include work related to, but are not limited to, functional specification, technical specification, reports, interfaces, process definition, strategy, organizational change, and others.

A project method 104 refers to a standard specification or procedure that provides guidelines for working on and completing a project, for instance, information about the procedure the project team members are expected to follow when working on a particular project and the deliverables they are expecting to generate.

Full text analysis 106 clusters work-items from the work repository into common categories. Method analysis 108 identifies possible relations among work-item categories, for example, by parsing and extracting information from the project method 104. A project work breakdown structure, as defined by the method, could be automatically created in a work-item-based repository 102 changed over time by one or more users.

Full Text analysis 106 of the work-items and the information obtained from the method analysis 108 (such as teams and project releases) enable discovery of relations between work-item instances. Project Managers 110 may review the process and resolve conflicts, if any. Identified work-item links may be deployed, for instance, updated or stored along with the work-items, for example, in the work-item repository 102.

Figure 2:
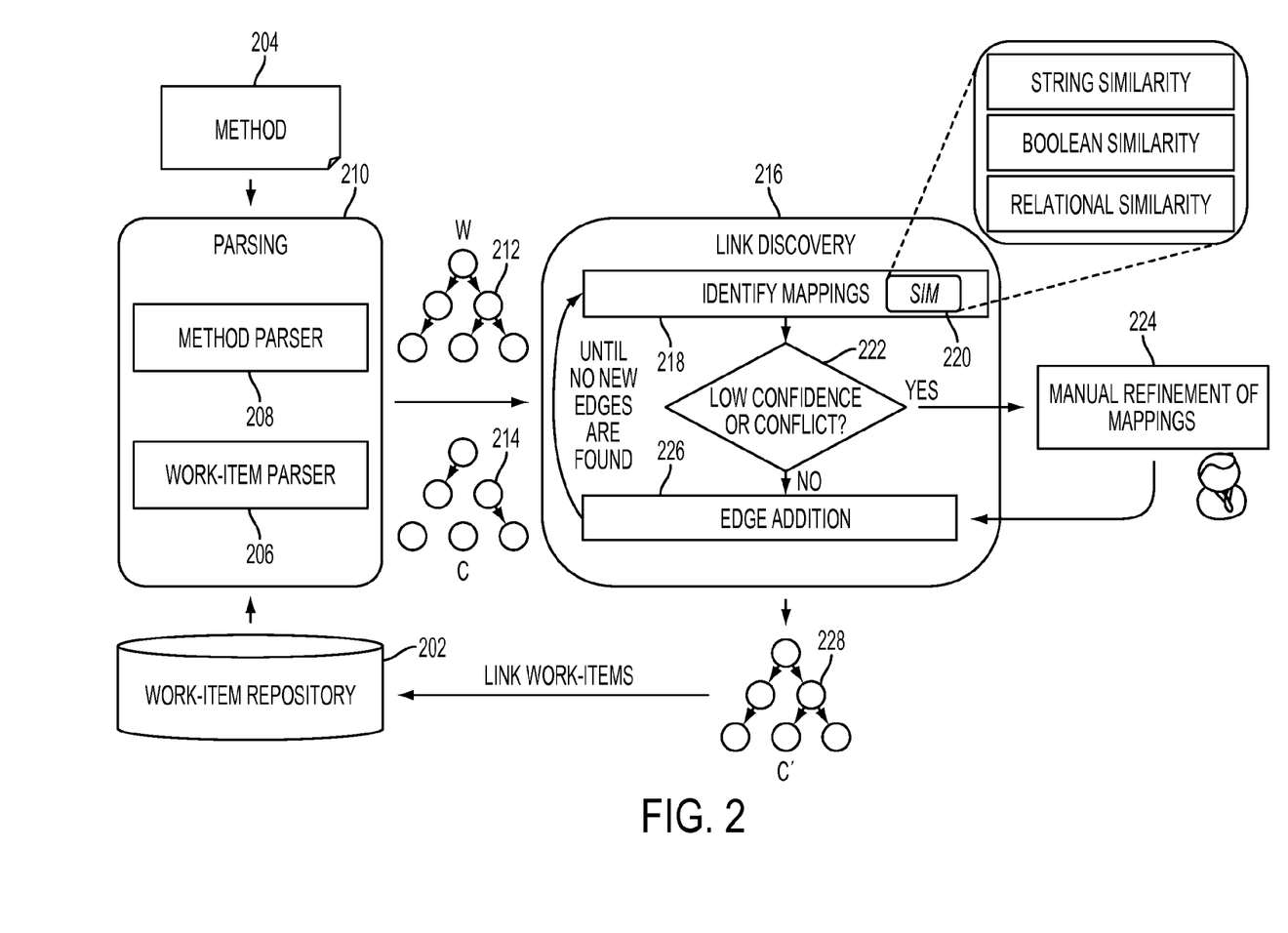
FIG. 2 is a diagram showing system architecture and methodology in one embodiment of the present disclosure.

FIG. 2 is a diagram showing system architecture and methodology in one embodiment of the present disclosure. A parsing component or functionality 210 may include a method parser 208 and a work-item parser 206. The method parser 208 analyzes and parses through a procedural specification (referred to also as method) 204. The procedural specification may be in the form of a free-text, structured context (XML), or others. The method parser 208 generates elements of the procedural specification and links or relationships among those elements. For instance, as a result of the method parsing at 208, a relational graph 212 may be built or formed. For example, a method 204 may be represented as an attribute relational graph 212, $W=(V_W, E_W, A_W)$ with method elements (e.g., tasks, work-products) as nodes and their inter-relationships as edges. In one embodiment, $V_W$ defines elements of a method such as, as example, tasks and deliverables. Method elements are usually represented as work-items. $E_W$ represents binary relations between method elements (e.g., children of, Related to). Finally, $A_W$ defines features, also referred to as attributes, (e.g., title, description, role) of a method element.

The work-item parser 206 analyzes and parses work-items stored in a work-item repository 202, and generates work-item elements and their relationships. For instance, as a result of work-item parsing at 206, a collection of work-items may be represented as an attribute relational graph 214, $C=(V_C, E_C, A_C)$, with work-items as nodes and links between work-items as edges. $V_C$ represents work-items or work-item elements. $A_C$ is defined similarly as in $A_W$. $A_C$ includes attributes of work items. $E_C$ defines relationship between work-items, similarly to $E_W$. Although the work-items in C 214 are created to serve the work outlined in W 212, often there is no one-to-one correspondence. There may be similarities between nodes (tasks/work-products) in W 212 and nodes (work-items) in C 214, in terms of their text description, roles, related artifacts, etc. But, links between work-items may be missing. Hence, frequently C does not reflect the same structure as in W. Also, C can have nodes missing in W and vice-versa.

A link discovery module or functionality 216 takes or receives as input the parsed elements of the method 204 and links (or relationships) among them, for example, in a data structure format such as a graph, for example graph W shown at 212. The link discovery module or functionality 216 also takes or receives as input the parsed elements of the work-items from the work-item repository 202 and links (or relationships) among them, for example, in a data structure format such as a graph shown at 214.

The link discovery module or functionality 216 compares the method elements and their relationships to the work-item elements and their relationships and discovers the missing work-item relationships. The output of the link discovery module or functionality 216 in one embodiment of the present disclosure includes an enriched work-item data structure that includes the missing relationships. For instance, a data structure such as a graph, $C'=(V_C, E_C+E_I, A_{C'})$, where $E_I$ is the set of inferred linkages between work-items may be generated. An algorithm for discovering such missing relationship in one embodiment of the present disclosure is described as follows.

A data structure to be output as an enhanced work-item C' is initialized to input parsed work-item elements and their relationships C, e.g., $C'=C$.

At 218, the algorithm identifies mappings between pair of nodes in C' and W such that they are highly similar in terms of their attributes. High similarity is computed by both applying similarity measures to single nodes $v_i$ (and its attributes $c_k$) and by looking at pair of nodes $v_i$ and $v_j$ linked through a relation in $E_C+E_I$. In one embodiment of the present disclosure, a node in C' can be mapped to at-most one node in W; a node in W can have multiple mapped instances in C'. Thus, a work-item element can be mapped to at-most one method element, however, a method element may be mapped to one or more of work-item elements. The similarity may be determined to be "high" if the measure meets a defined threshold or criteria.

Mapping may be performed by one or more similarity comparison methodologies 220, for instance, by string similarity, boolean similarity, and/or relational similarity. String similarity methodology refers to comparing text strings associated with a method element (and its features) and work-item elements (and its features). Different string similarity methodology can be applied, including but not limited to Bonacci distance, Hamming distance and Jaccard Distance. Boolean similarity identifies mapping by making use of partial matching and features weights as in the vector space model. Relational similarity refers to comparing the elements also in context of their neighbors. For instance, if the neighbor of a work-item element is similar to the neighbor of a method element, the work-item element and the method element's similarity measure is strengthened or increased.

At 222, if the mapping creates conflicts, or has low confidence, resolution may be sought from human user (e.g., project manager). Conflicts in mapping may occur, for instance, when the mapping identifies two possible classifications for a single work-item, both with a high level of confidence. A mapping may be determined to have low confidence, for instance, in case the Relational similarity finds a work-item can not be clustered with any similar elements in the neighbor of a method element. In another embodiment, the algorithm may be interactive such that a user may view the mapping and determine manually by inspection, whether the mapping has conflicts or low confidence. At 224, using a user input, any conflict in the mapping may be resolved. The mapping may also be refined with user input.

At 226, edge addition processing is performed. For instance, it is determined whether two nodes in C' are mapped to two vertices, respectively, of an edge in W. If two nodes in C' are respectively mapped to two vertices of an edge in W, then an edge between the two nodes in C' is added, if the edge does not already exist.

The algorithm repeats the above steps 218 to 226 until no new edges can be added, for instance, all edges found in method elements 212 are added to the similar or corresponding work-item elements 214. At 228, an enhanced work-item and mapping data structure is produced, and the work-item repository 202 may be updated with the added relationships.

Figure 3:
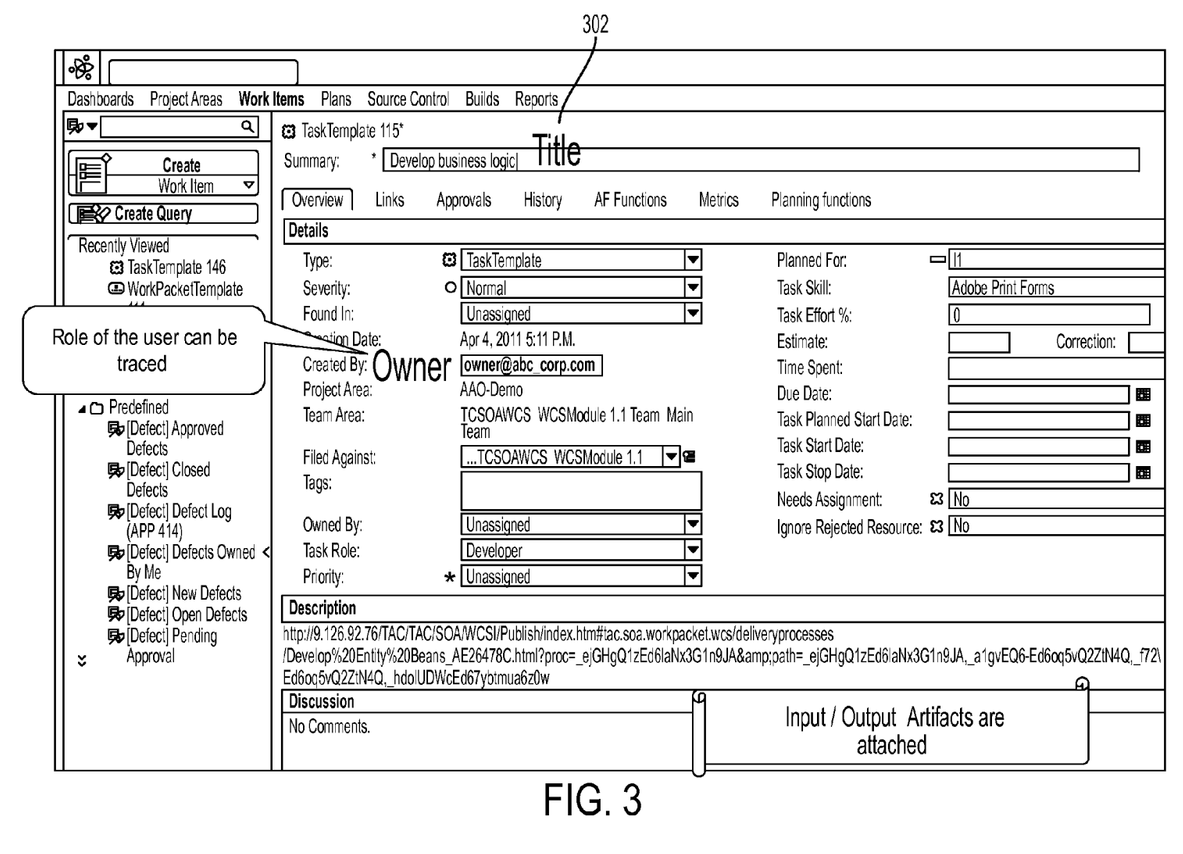
FIG. 3 is an example of a work-item entry, which may be created or entered via a tool with a user interface screen in one embodiment of the present disclosure.

FIG. 3 is an example of a work-item entry, which may be created or entered via a tool with a user interface screen as shown. As discussed above, software tools exist that track and manage projects based on work-items involved in the projects. An example is Rational Jazz® set of tools from International Business Machines® Corporation, Armonk, N.Y. The Jazz® portfolio includes a common platform and a set of tools that enable all of the members of the extended development team to collaborate. Rational Team Concert™, for instance, provides a collaborative work environment for developers, architects and project managers with work item, source control, build management, and iteration planning support. It supports any process and includes agile planning templates for Scrum™ and the Eclipse Way™. Rational Quality Manager™ is a web-based test management environment for decision makers and quality professionals. It provides a customizable solution for test planning, workflow control, tracking and reporting capable of quantifying the impact of project decisions on business objectives. Rational Requirements Composer™ provides a requirements definition solution that includes visual, easy-to-use elicitation and definition capabilities. Requirements Composer™ enables the capture and refinement of business needs into unambiguous requirements that drive improved quality, speed, and alignment. The tools promote collaboration through the notion of shared work-item.

The example work-item shown is a task involving "developing business logic" as summarized by the title 302. The work-item can include a number of other characterizations associated with it as in the example screen. The entered work-item and the associated information may be stored as text document or another structured document in a work-item repository.

Figure 4:
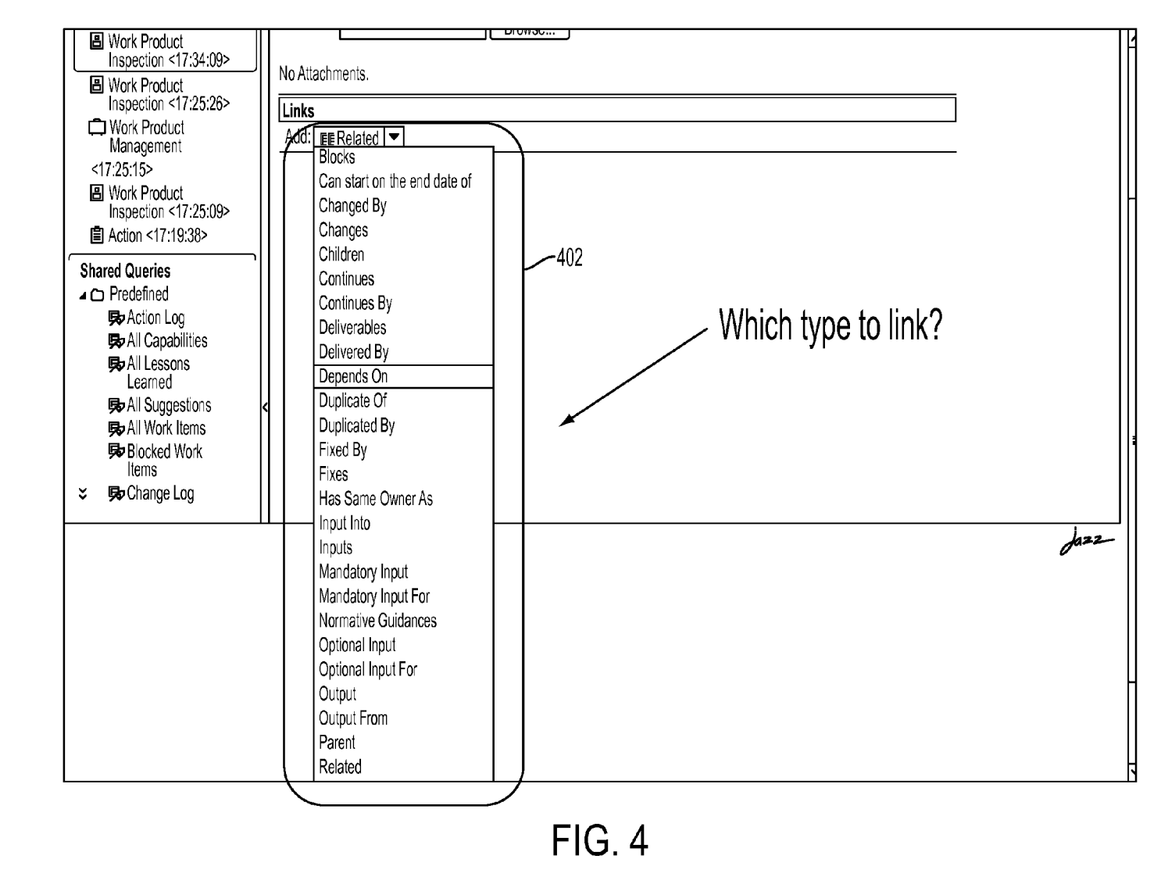
FIG. 4 illustrates a number of link types a work-item can have with other work-items in one embodiment of the present disclosure.

FIG. 4 illustrates a number of link types, thus relationships, a work-item can have with other work-items. FIG. 4 is a screen shot of a software tool that allows users to create work-items and track projects based on the work-items. The software tool enumerates a number of different link types 402 that indicates different relationships a work-item can have with other work-items.

Figure 5:
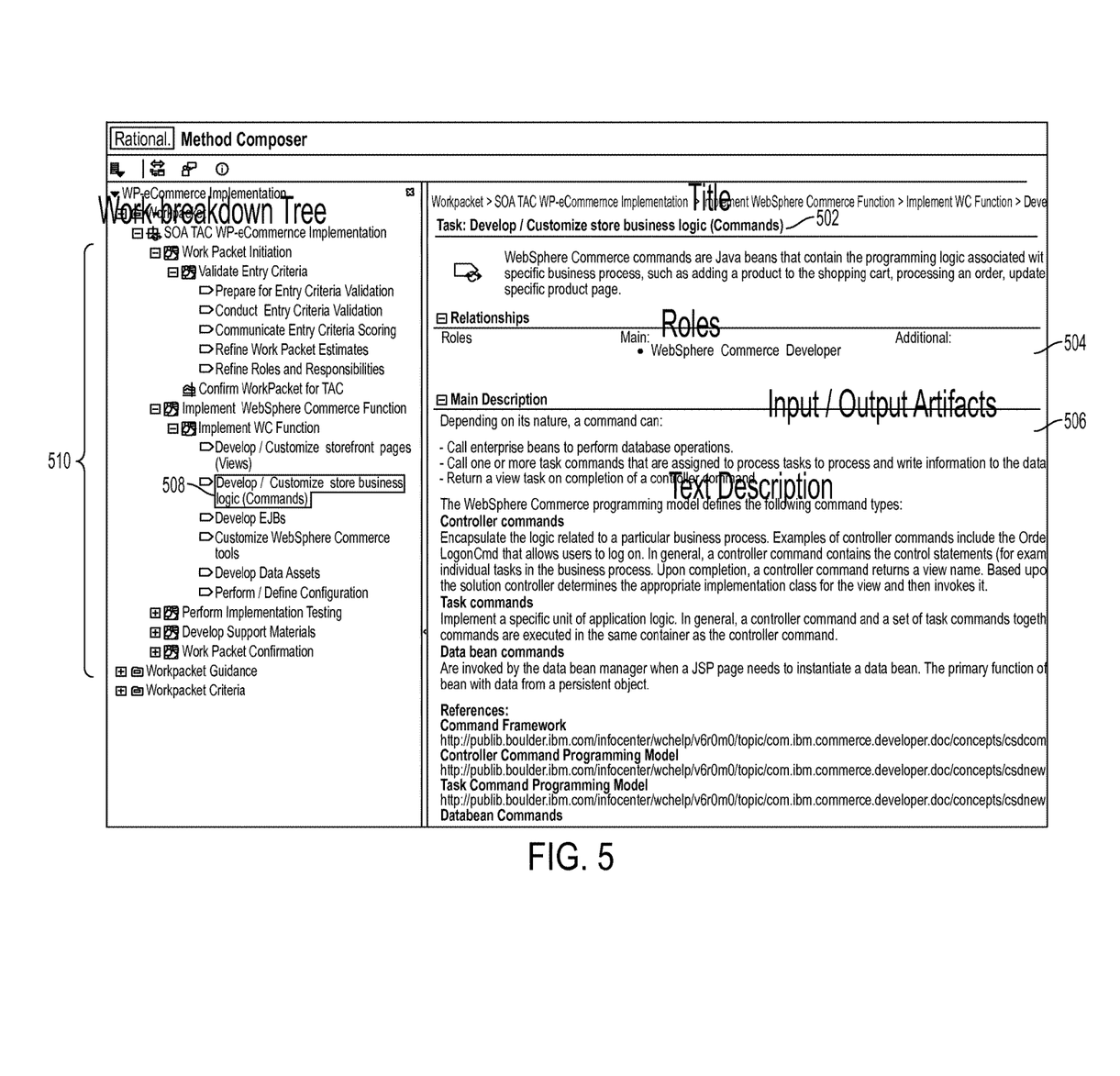
FIG. 5 illustrates an example of a method specification or guideline, for instance, which may be provided to a project team to follow when working on a specified project in one embodiment of the present disclosure.

FIG. 5 illustrates an example of a specification or guideline, referred to in this technological art and industry as a "method", which is usually provided to a project team to follow when working on a specified project. The specification is shown in this example via a tool that allows users to enter or create such specifications. In another embodiment, such specification may be in the form of text documents, web pages, and others. As shown, the specification may include the title of a task involved in a project, in this example, "Develop/Customize store business logic (Commands)" 502. The specification may also indicate one or more relationships 504 this task has with other parts (or tasks) of the project or even possible other projects. The specification may also include a description of the task 506. Other information may be provided in such specifications. The left hand side of the screen shows different tasks, a work-breakdown tree 510, involved in a project, in which the current task 508 is included.

In one aspect of the present disclosure, the methodologies may be used when different projects (or project phases) are merged. For instance, work-items from different projects may be linked according to a methodology of the present disclosure in one embodiment. In another aspect of the present disclosure, the analysis of the standardized method (prescriptive plan, specification or guidelines for practices to follow in working in and completing a project) may be used by method experts to continuously refine the recommended method for future projects. Yet in another aspect, the discovery of relations among work-item elements may facilitate realizing an End to End traceability for the project. Still yet, the discovered relations among work-items may be applied to prevent work-items from being moved to testing before their dependent ones are completed.

Figure 6:
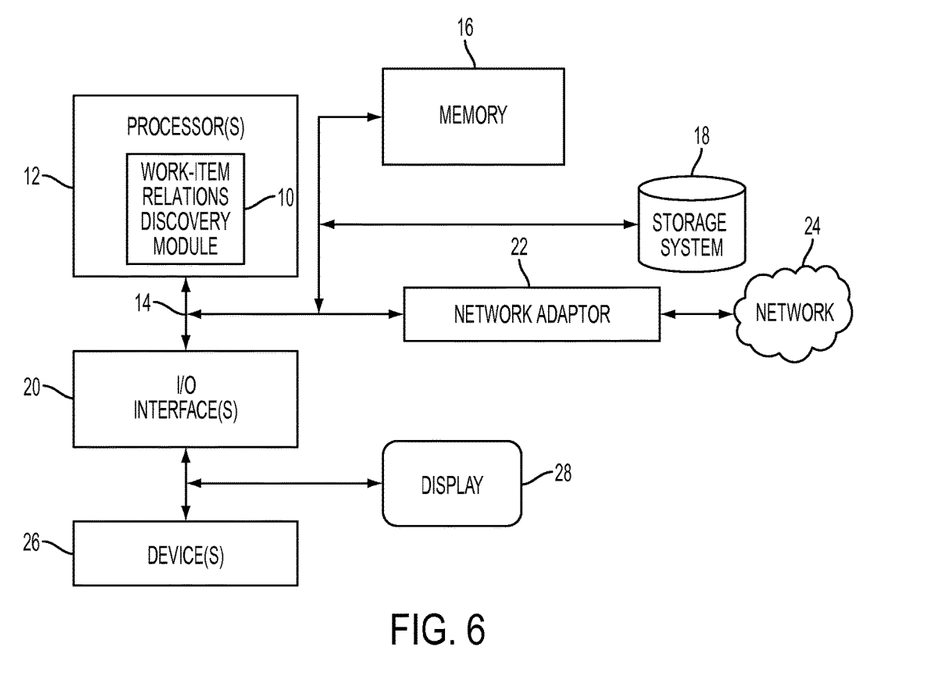
FIG. 6 illustrates a schematic of an example computer or processing system that may implement the work-item relations discovery system in one embodiment of the present disclosure.

FIG. 6 illustrates a schematic of an example computer or processing system that may implement the work-item relations discovery system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a work-item relations discovery module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of discovering work-item relations, comprising:
analyzing, automatically by a processor, a description of a collection of work-items created in one or more projects, to generate a plurality of work-item elements and their relationships;
analyzing, automatically by the processor, one or more standardized specifications describing practice guidelines to follow in executing said one or more projects and deliverables expected to be generated, to generate a plurality of standardized specification elements and their relationships represented as nodes and edges, the one or more standardized specifications specified in a text form and comprising a title of a task involved in the one or more projects, a relationship the task in the one or more projects has with another task in the one or more projects, description of the task, the one or more standardized specification further comprising a work-breakdown tree with different tasks comprising at least the task;
mapping, automatically by the processor, said plurality of work-item elements to said plurality of standardized specification elements,
the mapping comprising identifying a threshold similarity between a single work-item element node and a standardized specification element, and between a pair of work-item element nodes with associated link relationship and a pair of standardized specification elements with associated link relationship, wherein the single work-item element node is mapped at most to one standardized specification element, the identifying the threshold similarity comprising one or more of string similarity, Boolean similarity and relational similarity;
discovering, automatically by the processor, at least one or more missing relations among said plurality of work-item elements based on said mapping,
wherein the relationships comprise at least one or more of changed by, has same owner as, input from and output to;
receiving, based on at least on one of a determination that the mapping creates a conflict and the mapping has a low confidence, input from a user to resolve the at least one of the conflict in the mapping and the low confidence in the mapping; and
adding, automatically by the processor, the discovered one or more missing relations as edges to the mapping.

2. The method of claim 1, wherein said step of discovering includes:
selecting a collection of standardized specification elements that are related and discovering a pair of work-item elements that are mapped to said selected collection of standardized specification elements, and if said pair of work-item elements does not have a relationship, linking said pair of work-item elements.

3. The method of claim 2, further including:
repeating the step of selecting until all work-item elements have links corresponding to the mapped standardized specification elements.

4. The method of claim 1, wherein said collection of work-items are created in a work-item-based software used to track activities executed in said one or more projects.

5. The method of claim 1, wherein each of the work-item indicates a single unit of work needed to be completed in a context of said one or more projects.

6. The method of claim 1, wherein said work-items include design documents, issues, risks, test cases, and bugs.

7. The method of claim 1, wherein the work-items include functional specification, technical specification, reports, interfaces, process definition, strategy, and organizational change.

8. The method of claim 1, wherein the step of analyzing one or more standardized specifications include identifying work phase, work-item input, work-item output, role, type, guidance, title, and suggested project work breakdown structure.

9. The method of claim 8, wherein the suggested project work breakdown structure is automatically created in work-item-based software and changed overtime by one or more users.

10. The method of claim 1, further including refining said standardized specification based on the analyzing steps.

11. The method of claim 1, wherein the collection of work-items are associated with two or more projects that have been merged.

12. A method of discovering work-item relations, comprising:
identifying, automatically by a processor, mappings of work-item elements to standardized specification elements, by automatically analyzing a plurality of work-item elements and their relationships generated from a description of a collection of work-items, each of the work-items indicating a single unit of work needed to complete a project, and a plurality of standardized specification elements and their relationships represented as nodes and edges generated from a description of practice guidelines for completing the project, the practice guidelines specified in a text form and comprising a title of a task involved in the one or more projects, a relationship the task in the one or more projects has with another task in the one or more projects, description of the task, the one or more standardized specification further comprising a work-breakdown tree with different tasks comprising at least the task,
wherein the identifying of the mappings comprises identifying a threshold similarity between a single work-item element node and a standardized specification element, and between a pair of work-item element nodes with associated link relationship and a pair of standardized specification elements with associated link relationship, wherein the single work-item element node is mapped at most to one standardized specification element, the identifying the threshold similarity comprising one or more of string similarity, Boolean similarity and relational similarity;
discovering, automatically by the processor, one or more missing relations among said plurality of work-item elements based on said mappings,
wherein the relationships comprise at least one or more of changed by, has same owner as, input from and output to;
receiving, based on at least on one of a determination that the mapping creates a conflict and the mapping has a low confidence, input from a user to resolve the at least one of the conflict in the mapping and the low confidence in the mapping; and automatically adding the discovered one or more missing relations as edges to the mapping.

13. The method of claim 12, wherein said step of discovering includes:

selecting a collection of standardized specification elements that are related and discovering a pair of work-item elements that are mapped to said selected collection of standardized specification elements, and if said pair of work-item elements does not have a relationship, linking said pair of work-item elements.

14. The method of claim 13, further including:

repeating the step of selecting until all work-item elements have links corresponding to the mapped standardized specification elements.

15. A system for discovering work-item relations, comprising:

a processor; and a link discovery module operable to:

execute on the processor;

automatically identify mappings of work-item elements to standardized specification elements, by automatically analyzing a plurality of work-item elements and their relationships generated from a description of a collection of work-items, each of the work-items indicating a single unit of work needed to complete a project, and a plurality of standardized specification elements and their relationships represented as nodes and edges generated from a description of practice guidelines for completing the project, the practice guidelines specified in a text form and comprising a title of a task involved in the one or more projects, a relationship the task in the one or more projects has with another task in the one or more projects, description of the task, the one or more standardized specification further comprising a work-breakdown tree with different tasks comprising at least the task, wherein the mappings are identified by determining a threshold similarity between a single work-item element node and a standardized specification element, and between a pair of work-item element nodes with associated link relationship and a pair of standardized specification elements with associated link relationship, wherein the single work-item element node is mapped at most to one standardized specification element, the identifying the threshold similarity comprising one or more of string similarity, Boolean similarity and relational similarity;

automatically discover one or more missing relations among said plurality of work-item elements based on said mappings, wherein the relationships comprise at least one or more of changed by, has same owner as, input from and output to;

receive, based on at least on one of a determination that the mapping creates a conflict and the mapping has a low confidence, input from a user to resolve the at least one of the conflict in the mapping and the low confidence in the mapping; and automatically add the discovered one or more missing relations as edges to the mapping.

16. The system of claim 15, further including:

a method parser operable to parse said description of practice guidelines and generate said plurality of standardized specification elements and their relationships; and a work-item parser operable to parse said description of a collection of work-items and generate said plurality of work-item elements and their relationships.

17. A non-transitory computer readable storage medium storing a program of instructions executable by a machine to perform a method of discovering work-item relations, comprising:

identifying, automatically by a processor, mappings of work-item elements to standardized specification elements, by automatically analyzing a plurality of work-item elements and their relationships generated from a description of a collection of work-items, each of the work-items indicating a single unit of work needed to complete a project, and a plurality of standardized specification elements and their relationships represented as nodes and edges generated from a description of practice guidelines for completing the project, the practice guidelines specified in a text form and comprising a title of a task involved in the one or more projects, a relationship the task in the one or more projects has with another task in the one or more projects, description of the task, the one or more standardized specification further comprising a work-breakdown tree with different tasks comprising at least the task, wherein the identifying of the mappings comprises identifying a threshold similarity between a single work-item element node and a standardized specification element, and between a pair of work-item element nodes with associated link relationship and a pair of standardized specification elements with associated link relationship, wherein the single work-item element node is mapped at most to one standardized specification element, the identifying the threshold similarity comprising one or more of string similarity, Boolean similarity and relational similarity;

discovering, automatically by the processor, one or more missing relations among said plurality of work-item elements based on said mappings, wherein the relationships comprise at least one or more of changed by, has same owner as, input from and output to;

receiving, based on at least on one of a determination that the mapping creates a conflict and the mapping has a low confidence, input from a user to resolve the at least one of the conflict in the mapping and the low confidence in the mapping; and automatically adding the discovered one or more missing relations as edges to the mapping.

18. The computer readable storage medium of claim 17, wherein said step of discovering includes:

selecting a collection of standardized specification elements that are related and discovering a pair of work-item elements that are mapped to said selected collection of standardized specification elements, and if said pair of work-item elements do not have a relationship, linking said pair of work-item elements.

19. The computer readable storage medium of claim 18, further including:

repeating the step of selecting until all work-item elements have links corresponding to the mapped standardized specification elements.

20. The computer readable storage medium of claim 19, wherein said collection of work-items are created in a work-item-based software used to track activities executed in said one or more projects.

21. The computer readable storage medium of claim 19, wherein the description of practice guidelines for completing the project includes work phases, work-item input, work-item output, role, type, guidance, title, and suggested project work breakdown structure.

* * * * *